(12) United States Patent
Pennington et al.

(10) Patent No.: US 10,671,805 B2
(45) Date of Patent: Jun. 2, 2020

(54) DIGITAL PROCESSING AND COMPLETION OF FORM DOCUMENTS

(71) Applicant: HRB Innovations, Inc., Las Vegas, NV (US)

(72) Inventors: Robert Jefferson Pennington, Snow Camp, NC (US); Ralph Bryan Howell, Browns Summit, NC (US)

(73) Assignee: HRB Innovations, Inc., Las Vegas, NV (US)

( * ) Notice: Subject to any disclaimer, the term of this patent is extended or adjusted under 35 U.S.C. 154(b) by 181 days.

(21) Appl. No.: 14/633,519

(22) Filed: Feb. 27, 2015

(65) Prior Publication Data

US 2016/0253303 A1    Sep. 1, 2016

(51) Int. Cl.
| | |
|---|---|
| G06F 40/174 | (2020.01) |
| G06K 9/00 | (2006.01) |
| G06Q 40/00 | (2012.01) |
| G06Q 10/10 | (2012.01) |

(52) U.S. Cl.
CPC ....... *G06F 40/174* (2020.01); *G06K 9/00442* (2013.01); *G06Q 10/10* (2013.01); *G06Q 40/123* (2013.12)

(58) Field of Classification Search
CPC .................................................... G06F 17/243
See application file for complete search history.

(56) References Cited

U.S. PATENT DOCUMENTS

| | | | |
|---|---|---|---|
| 6,950,980 B1* | 9/2005 | Malcolm | G06F 17/00 |
| 7,505,982 B2* | 3/2009 | Wang | G06F 3/03545 |
| 2005/0055290 A1* | 3/2005 | Bross | G06Q 30/06 |
| | | | 705/31 |
| 2006/0178961 A1* | 8/2006 | Stanley | G06Q 40/02 |
| | | | 705/31 |
| 2007/0208636 A1* | 9/2007 | Johnson | G06Q 20/207 |
| | | | 705/30 |
| 2012/0063684 A1* | 3/2012 | Denoue | G06F 17/243 |
| | | | 382/175 |
| 2012/0215669 A1* | 8/2012 | Lieberman et al. ... | G06Q 40/00 |
| 2013/0204840 A1* | 8/2013 | Jarvis | G06F 17/30867 |
| | | | 707/611 |
| 2014/0123057 A1* | 5/2014 | Eigner et al. | G06F 3/0487 |
| 2014/0244456 A1* | 8/2014 | Huang et al. | G06Q 40/103 |
| 2015/0095753 A1* | 4/2015 | Gajera | G06F 17/248 |
| | | | 715/226 |

* cited by examiner

*Primary Examiner* — James J Debrow
(74) *Attorney, Agent, or Firm* — Erise IP, P.A.

(57) ABSTRACT

A system, a computer program, and a computerized method for the processing and completion of form documents. A form processing engine receives the form from the user. The form processing engine captures and stores an image of the form and extracts field metadata from the form, specifically each field on the form by name, type, and position. A form completion engine then renders the captured image of the form and generates a field overlay. The form completion engine populates the field overlay with user data as retrieved from a user information data store. The form completion engine may add additional objects and events to the form and invite the user to provide additional information. Completion of form documents is streamlined and largely or completely automated.

16 Claims, 4 Drawing Sheets

DIGITAL PROCESSING AND COMPLETION OF FORM DOCUMENTS

BACKGROUND

1. Field

Embodiments of the invention relate to form documents. More specifically, embodiments of the invention relate to the digital processing and completion of form documents.

2. Related Art

Various entities require the completion of form documents in furtherance of business, government, or charitable purposes. To streamline and ease the completion of these forms, many forms are available in an electronic format. The electronic formats of documents, such as the Portable Document Format ("PDF"), allow a user to type required information onto the form instead of handwriting the information.

There are a number of drawbacks in form processing and completion of the prior art. First, systems of the prior art require that the user identify and select the proper PDF form from a data store. Some entities, such as government agencies, produce a plethora of forms having multiple variations and versions. Often the user has a copy, either physical or digital, of the necessary form that was supplied to them. Nonetheless, they must locate another copy from a data store. Second, systems of the prior art require the user to enter all information manually, even though the majority of the necessary information to complete the form is already known by the system or available on previously submitted form documents. Third, systems of the prior art do not generate a perfect copy of the form document but instead independently create a PDF form for completion. These independently created forms may not be true to the original and may be outdated or of another variation of the form. This requires the user to visually ensure that the form they are completing is identical to their supplied form document.

SUMMARY

Embodiments of the invention solve the above-mentioned problems by providing a system, a non-transitory computer-readable medium, and a computerized method for the processing and completion of form documents, comprising a form processing engine and a form completion engine. The form processing engine receives the form from the user, instead of requiring the user to locate the form document within a data store. The form processing engine captures and stores an image of the form. The form processing engine extracts field metadata from at least one field on the form document, specifically each field on the form document by name, type, and position. The form completion engine then renders the captured image of the form and generates a field overlay. The form completion engine populates the field overlay with user data as retrieved from a user information data store. The form completion engine may add custom objects and events to the form document and invite the user to edit and provide additional information. The invention thereby streamlines and largely automates the completion of form documents.

Embodiments of the invention are generally directed to a system for processing and completing form documents. The system comprises the form processing engine, the form completion engine, and the form management application, as discussed above. The form processing engine includes an image capture engine and a field extraction engine.

Embodiments of the invention are also generally directed to a computerized method for the digital processing and completion of form documents. Yet further embodiments of the invention are directed to a non-transitory computer readable storage medium having a computer program stored thereon for processing and completing form documents.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

Figure 1:
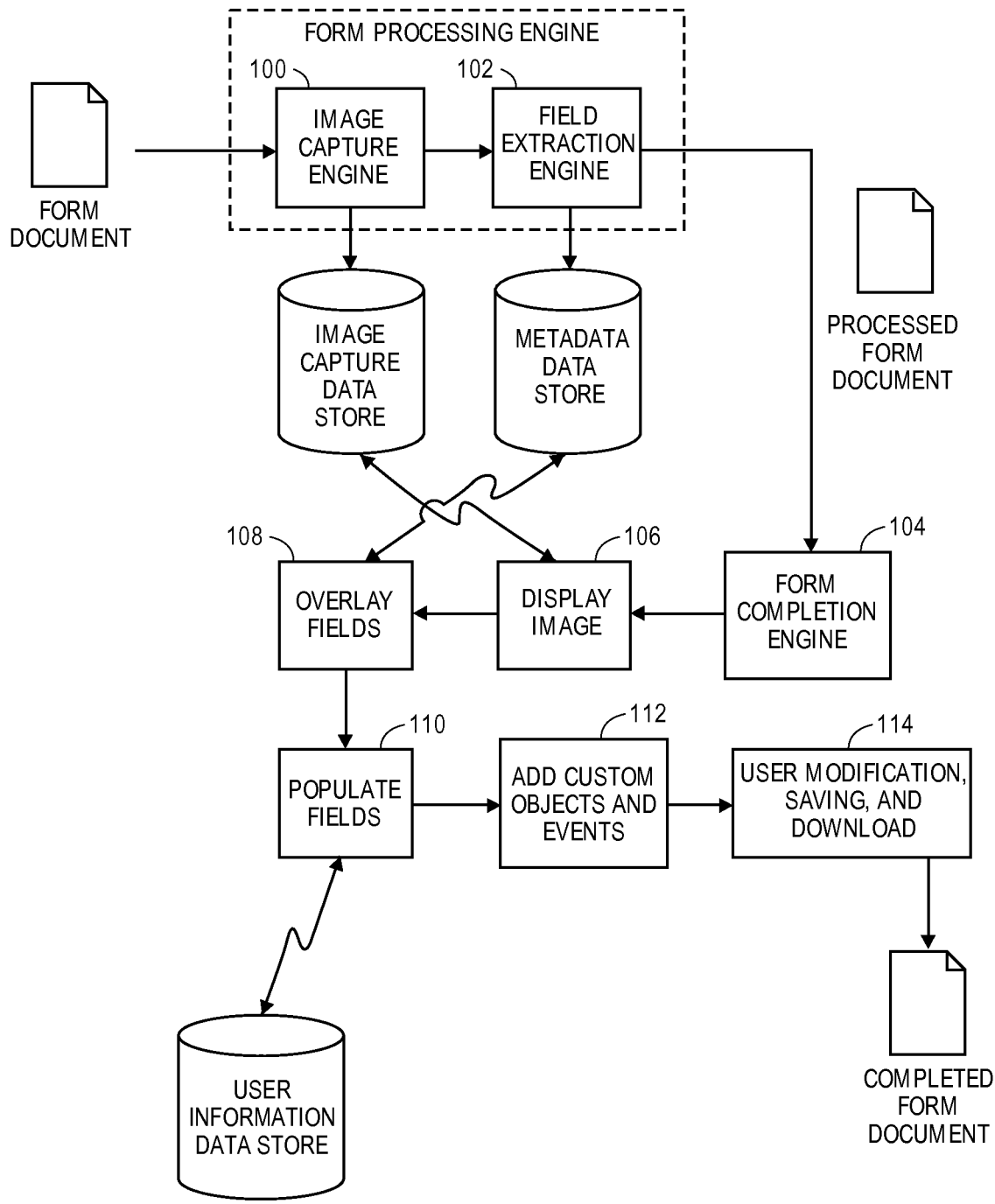
FIG. 1 is a flow diagram of an exemplary embodiment of the invention, illustrating the transformation of the form document into a completed form document.

The drawing figures do not limit embodiments the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, embodiments of the invention can include a variety of combinations and/or integrations of the embodiments described herein.

Embodiments of the invention comprise a system, a computerized method, and a computer program for processing and completing form documents. Embodiments of the invention utilize a form processing engine to capture an image of the form and extract field metadata from at least one field; and a form completion engine to render the image, generate a field overlay, and populate the at least one field. Generally speaking, in embodiments of the invention, the form processing engine prepares the processed form document for completion, whereas the form completion engine completes the fields on the processed form document. The form processing engine and/or the form completion engine may rely on manual input to perform the discussed functions.

Embodiments of the invention are suitable for a variety of types of forms provided by a variety of different entities. For example, governments commonly provide forms that must be completed to, for example, obtain government services or benefits or comply with various rules or regulations. Governments are not the only types of entities that provide such forms, however. For example, a doctor may provide a paper form to be filled out by a patient to obtain patient information. As another example, a bank may provide a digital form to be filled out by a loan applicant to obtain a loan. Embodiments of the invention are applicable to various types of entities providing forms to be completed by a user, and it should be appreciated that embodiments of the invention may be applied to any particular type of entity, service, or product. Embodiments of the invention are particularly advantageous with government forms, however, given the large volume and variety of government forms. This is especially appropriate for forms provided by the Internal Revenue Service and for a taxpayer filling out forms related to a tax return. Therefore, embodiments of the invention as described herein will be in reference to a tax form provided by a government taxing authority, such as the IRS, and a taxpayer completing the forms.

It should be appreciated that although the entity preparing the form document is labeled herein a user, embodiments of the invention contemplate that any entity may receive, complete, and submit form documents. The user may complete the form document on behalf of another. In embodiments discussed for submitting tax forms, the user may be a taxpayer, a tax preparer, a financial professional, or other legal or natural person. Thus, use of the labels "user" and "taxpayer" herein is not intended to be limiting, and may be used interchangeably.

As discussed in more detail below, embodiments of the invention may be advantageously used to acquire user information stored in a user information data store. For example and keeping with the embodiment of a taxpayer user, user information comprising taxpayer information from prior year tax returns may be stored in the user information data store. Embodiments of the invention are operable to obtain the stored information and prepare the completed form document without requiring the user to input the user information.

It is contemplated that the form document may be populated with user information that is specific to a particular person or entity. In embodiments of the invention, the person or entity using the invention to prepare the completed form document is the same person or entity with which the user information is associated. However, in embodiments, the preparer of the form document using the invention may not necessarily be the same person or entity with which the user information is associated. As an example, user information for a tax return refers to the taxpayer for whom the tax return is being prepared and filed. However, the user of the form document who is preparing the form document may be a CPA or a third party working on behalf of the user. Therefore, reference to a user preparing the form document is not intended to mean the same user for which the user information is associated but instead may also cover an embodiment where the user preparing the document is not associated with the user information stored in the user information data store.

As used herein, "form document" refers to a document that contains at least one field for completion by the user. The form document may be a physical, printed copy (hard-copy) of the document or a digital copy of the document. Additionally, or in the alternative, the document can be an electronic file containing text, structure, design, fonts, colors, and/or images. Additionally, or in the alternative, the document can be in any other format or medium that can be preserved and represented. The form document may be publicly available via a form repository, privately available, secured (requiring computer authentication prior to display) or unsecured, and it may be a copy or an original. As defined in this paragraph, the form document can refer to the blank form document as input by the user, the captured image thereof, the digitally recreated form document, necessary accompanying documents for the form document, the completed form document, etc.

As noted above, embodiments of the invention are advantageous for use in preparing and filing tax returns, although this should not be construed to mean that the invention is only for use with tax return documents. The tax return is a report filed with the appropriate government taxing authority, such as the Internal Revenue Service in the case of U.S. federal income tax. Typically, the tax return contains information used to calculate the tax due. Typically, the tax return is either printed or hand-written on a form generated by the taxing authority, such as the Form 1040. However, the tax return could be on another type of form, a financial document, or other document. On the tax return, the taxpayer or tax preparer calculates the taxes due. To assist in the calculation and to allow the taxing authority to verify the calculations, the tax return contains pertinent information associated with the taxpayer for the tax year. The tax return can be either written, digital, or a combination of both. In other embodiments, information relevant to the taxpayer and the tax to be paid are provided on other various forms and documents.

The set of user information that is stored in the user information data store (which, for embodiments specific to tax returns may be referred to as the taxpayer information data store) may comprise user information that is useful or required in completing the form document. For example, in the tax return embodiment, the taxpayer information data store may include past years' tax returns, information extracted from the tax returns, information from previously completed form documents, and/or other data known about the taxpayer. The set of taxpayer information may also include tax returns from previous years and/or relevant to other taxing authorities for the current and/or previous years, financial records, and bank statements. In yet other embodiments, the set of taxpayer information received by the computer program further comprises qualitative data, contact information, and/or demographic information of the taxpayer. In some embodiments, all the information is stored as a single set. The taxpayer may also provide information to the system that the tax preparer does not have access to, such as financial records and bank statements.

Turning to the Figures, and specifically FIG. 1, the steps of the computerized method will now be discussed in greater detail. The method of creating a completed form document broadly comprises the following steps, some or all of which have substeps that will be discussed in more detail below. In Step 100, an image capture engine receives or acquires a form document from the user, captures an image of the form document, and stores the captured image in the image capture data store. In Step 102, a field extraction engine extracts field metadata from at least one field of the form document and stores the extracted field metadata in the metadata data store. In Step 104, the extracted field metadata is provided to the form completion engine. Next, in Step 106, the captured image is displayed, and in Step 108, the at least one field is overlayed on the displayed captured image. During the processing of the form document and prior to obtaining the completed form document, the captured image as annotated and edited will herein be referred to as the "processed form document." Turning back to the steps of embodiments of the invention, the at least one field is then populated with data from the set of user information in Step 110, and custom objects and events are added to the processed form document in Step 112. Finally, user modifications and completions to the processed form document are received in Step 114. These steps produce the completed form document that is thereafter downloaded, saved, and/or submitted by the user. Again, it should be appreciated that the discussed steps can be performed in any order, some steps may not be performed, and some steps may be performed simultaneously.

Figure 2:
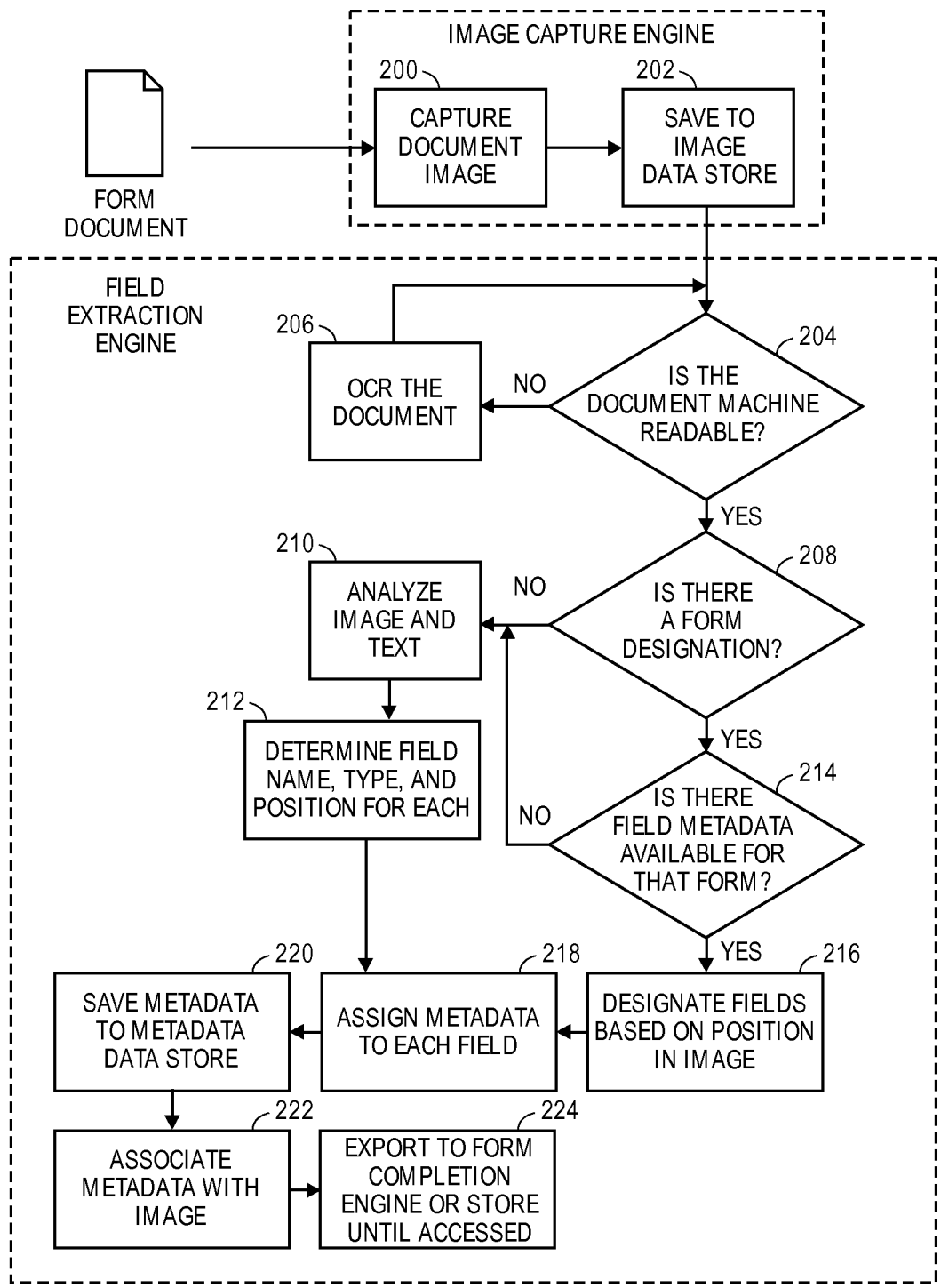
FIG. 2 is a flow diagram illustrating an exemplary operation of the form processing engine.

The form processing engine is illustrated in more detail in FIG. 2. The form processing engine receives, retrieves, or otherwise acquires the form document and processes the form document to be later displayed and completed by the form completion engine. As discussed above, the form document may be a digital image file, a digital fillable file (such as a fillable PDF), or a physical, paper document. If the form document is a digital fillable file, it may have field metadata already associated with the various fields included in the document. For example, a taxpayer may receive a notice document from the IRS through the mail informing the taxpayer that a certain form document was missing from their submitted tax return. For the convenience of the taxpayer, the notice document may include a copy of the needed form document. Instead of requiring the user to search for and retrieve a digital version of the form document from a data store or from the Internet, the form processing engine allows the taxpayer to directly scan the physical copy and work from the scanned image. The resultant completed form document will be a substantially identical copy of the scanned image with completed fields overlaid thereon. As another example, a business may e-mail a potential customer with an attachment that is a digital version of an order form. The potential customer may then load the attached order form document into the form processing engine to generate the completed form document.

In Step 200, the image capture engine produces or receives a digital copy of the form document. The image capture engine is a subcomponent of or associated with the form processing engine. In some embodiments, the image capture engine is software for receiving and formatting the image of the form document. In other embodiments, the image capture engine is a physical scanning machine and associated software. In still other embodiments, the image capture engine is a digital camera and associated software. As one example, the user may locate a file depicting the form document from a data store of the user's computer and import the file into the image capture engine. As another example, the image capture engine may interface with a physical scanner associated with the user's computer and receive scanned images from the scanner.

In Step 202, the captured or created image is stored on or otherwise associated with the image capture data store. In embodiments of the invention, the image capture data store maintains a clean copy of the image, which is to say that there is no associated field metadata, overlays, or HTML markups associated with the image. There may be structural metadata and header metadata associated with the image. The image capture data store may be local, remote, or both. Any existing fillable fields on the form document are removed, so as to prevent redundancy with the overlaid fields that will be rendered by the form completion engine.

In some embodiments, previous input on the form document is hidden from the captured image. The hidden text may be saved or associated with field metadata to be later added back into the field. For example, the user may provide a partially completed form document to the image capture engine. The partially completed form document may have information such as the taxpayer name and contact information printed thereon, but have blank fields for the remainder of the form document. In some embodiments, the completed information is hidden in the captured image, such that it can be verified prior to re-insertion and formatted to match the rest of the data in the fields.

The form processing engine extracts or creates field metadata. The field metadata may be already existing and already associated with the form document, already existing and associated with an analogous form document having a similar or identical form designator (as discussed below), newly created based upon the text of the form document, newly created based upon other metadata associated with the form document (or an analogous form document), or some combination thereof.

Metadata associates one set of data with another set of data and/or provides information about a set of data. The metadata may be embedded in the captured image of the form document, stored externally in a separate file that is associated with the form document, otherwise associated with the form document, or all of the above. Embedding information about each of the fields into the same file with the form document data can be advantageous because it allows the metadata to travel as part of the data it describes. In some such embodiments, metadata is associated with a particular field or section of the form document. This is advantageous where, for example, the same form document contains more than one field. In other such embodiments, the metadata is associated with the form document as a whole. Externally stored metadata may also have advantages, such as ease of searching and indexing. The metadata may also be stored in a human-readable format, such that a user can access, understand, and edit the metadata without any special software.

Field metadata contains information about each or many of the fields in the form document. For example, the form document may have fields requiring information about the taxpayer, contact information, income, etc. Field metadata for each respective field may include information about that field such as the position of the field on the form document, the name of the field, the type of the field (e.g., checkbox or text string), the acceptable input into the field (e.g., numerals only, alphabet only, alphanumeric), the maximum length of the input, etc.

In Step 204, the field extraction engine determines whether the text of the form document is machine-readable.

If it is not, the field extraction engine may perform an optical character recognition (OCR) of the image or the form document in Step 206. OCR determines the text of the form document and allows the field extraction engine to perform the remaining tasks discussed below.

In Step 208, the field extraction engine determines if there is a form designator on the form document. Many form documents have a form designator that provides a name or number for the form document. This provides a quick and easy reference to information about the form document and to other copies of the form document. For example, a common form document is the IRS's Form 1040. The "1040" is the form designation. If there is a form designation, the field extraction engine performs Step 214, as discussed below.

If there is not a form designation, the field extraction engine will analyze the image and text of the form document in Step 210. The field extraction engine may also use OCR, or a similar recognition protocol, to determine the size and position of fields. For example, fields in the form document may be designated by rectangles into which the text is to be entered. The field extraction engine analyzes the form document for information indicative of such fields. For each such field discovered, the field extraction engine determines a location. For example, the location may be measured using a coordinate system measuring the number of pixels to the right and up from the lower left corner of the form document to the lower left corner of the rectangle of the field.

The field extraction engine may also note the size and orientation of the field, such as a number of pixels to the right and up from the lower left corner of the rectangle to the upper right corner of the rectangle. The field extraction engine may also use the size and orientation of the rectangle to be indicative of the type and amount of information to be entered therein. For example, a field that is a circle or a small square may be intended as a checkbox instead of a field to be completed by text. As another example, a field that is a rectangle having a height comparable to the height of the surrounding text is likely indicative of a short string textual field, as opposed to a rectangle of a height that is several times the height of the surrounding text is likely indicative of a long string textual field.

Based upon the above analysis, the field extraction engine will determine a field name, a field type, and a field position for each field in Step 212. Each of these is a type of field metadata, and will now be discussed. Other field attributes, such as a font size and a font style, may also be determined.

The field name may be determined by the text immediately preceding it. For example, a field following text that reads "Taxpayer Name" may be given a field name of "Taxpayer Name" or "Name." The field extraction engine may also supplement the text immediately preceding the field with other known information. To continue the previous example, if the next field had text that reads "Address," then the field may be given a field name of "Taxpayer Address" to differentiate from a work address or an address of the tax preparer.

The field type may be determined by the size and orientation of the field, as discussed above. The field type is information indicative of the type of information that should be entered into the field. The field type may be determined in part by the field name. For example, a field name of "Taxpayer Address" will likely be of a type requiring a long string textual field of alphanumeric characters. Similarly, if the field is proceeded by text such as "Check all that apply," the field will likely be assigned a checkbox field type.

The field position is determined via the coordinate system as discussed above. In some embodiments, the field position further includes dimensions for the field. The dimensions may include a length and a width, measured in units such as pixels or millimeters. The dimension may additionally include orientation information. Orientation information may only be included for fields that are not parallel with the edges of the form document. For example, if the user has scanned a physical copy of the form document, the text and fields of the captured digital image may not be substantially parallel with the edges of the form document. Embodiments of the invention compensate for this discrepancy by assigning an orientation to each such affected field, and saving such information in the field metadata.

If, in Step 208 as discussed above, the field extraction engine determined a form designation on the form document, the field extraction engine determines if there is field metadata available that corresponds with that form designation, in Step 214. In determining whether there is field metadata available for that form designation, the field extraction engine may access a form repository (not illustrated) with a plurality of form documents thereon, each having field metadata corresponding to their respective fields. This plurality of form documents may have been created from previous iterations of the image capture engine and field extraction engine, from manually created form documents having the field metadata composed by a user, from the taxing authority or other entity as a publicly accessible resource, or some combination thereof. This form repository may be stored locally, remotely, or via the Internet.

The field extraction engine may additionally verify that the form document from the form repository is of the same version and otherwise substantially similar to the captured image of the form document. If the two form documents are not of the same version or otherwise substantially similar, the field extraction engine may ignore the form document from the form repository if the differences are substantial, or attempt to determine similarities and extract field metadata for fields that are substantially similar between the two versions. In this latter instance, the field extraction engine may perform Steps 210 and 212, as discussed above, as to the portions that were not found to be substantially similar.

If the field extraction engine determines that there is field metadata available that corresponds with the form designation of the form document, the field extraction engine designates a position for the field metadata based upon the images on the captured image in Step 216. For example, the field extraction engine may analyze the available field metadata to determine the location and orientation of the respective fields as they would appear on the captured image. The field extraction engine then designates fields based upon that field metadata and associates at least a portion of that field metadata with the newly designated fields.

If, in Step 214 as discussed above, there is no field metadata available for that form designation in the data store, the field extraction engine proceeds to perform Steps 210 and 212 discussed above. It should be noted that following Steps 210, 212, and 218 (discussed below), the captured image and the assigned field metadata may be saved to the data store for later use in future iterations of the method.

It should be noted that in embodiments of the invention, the field extraction engine does not perform Step 214 or 216. In this embodiment, regardless of whether there is a form designation, the field extraction engine analyzes the form document and the captured image and determines the field metadata without checking for available field metadata from the form repository. For example, if the form document contains field metadata for each field thereon, it may be redundant to consult the form repository, and as such the field extraction engine of the form processing engine will not complete Steps 214 and 216.

In Step 218, the field extraction engine assigns field metadata to each field within the captured image of the form document. The assigned metadata is based upon the available field metadata from the original form document and/or the form repository (Steps 214 and 216), the analysis of the images and text to determine the fields (Steps 210 and 212), or some combination thereof. The form processing engine may also associate custom objects and events with the form document, as discussed below in Step 314. In Step 220, the form processing engine stores the extracted field metadata in a metadata data store that is accessible by a form management application.

In Step 222, the assigned metadata is saved and associated with the captured image either in the captured image itself or in a separate file. In some embodiments, the captured image is stored in the image capture data store and the field metadata is stored in the metadata data store, as illustrated in FIG. 1. The captured image and the field metadata are associated such that they can be combined in the form completion engine, as discussed below. In some embodiments, the image capture data store and the metadata data store are located in the same physical hardware, in separate but local physical hardware, or in separate and remote physical hardware. In some embodiments, the field metadata is directly saved to the captured image file. In other embodiments, the field metadata and the captured image are separate but associated files.

In Step 224, the captured image and the field metadata, known collectively as the processed form document, are exported or sent to the form completion engine. In some embodiments of Step 224, the processed form document is stored until retrieved by the form completion engine.

It should be noted that various steps of the form processing engine may be performed, aided, assisted, or reviewed by a human operator. This operator may be the user, or an employee or agent associated with the form processing engine. In some embodiments, an operator oversees some or all of the above-discussed steps via manual input by the operator. In other embodiments, errors or incompleteness is monitored and corrected by the operator. For example, if the form processing engine cannot or does not render dimensions for a field, the operator may draw or denote the fields in the form processing engine. In this way, the operator can utilize the form processing engine to receive the form document, regardless of input format, and produce the processed form document for completion by the form completion engine.

Figure 3:
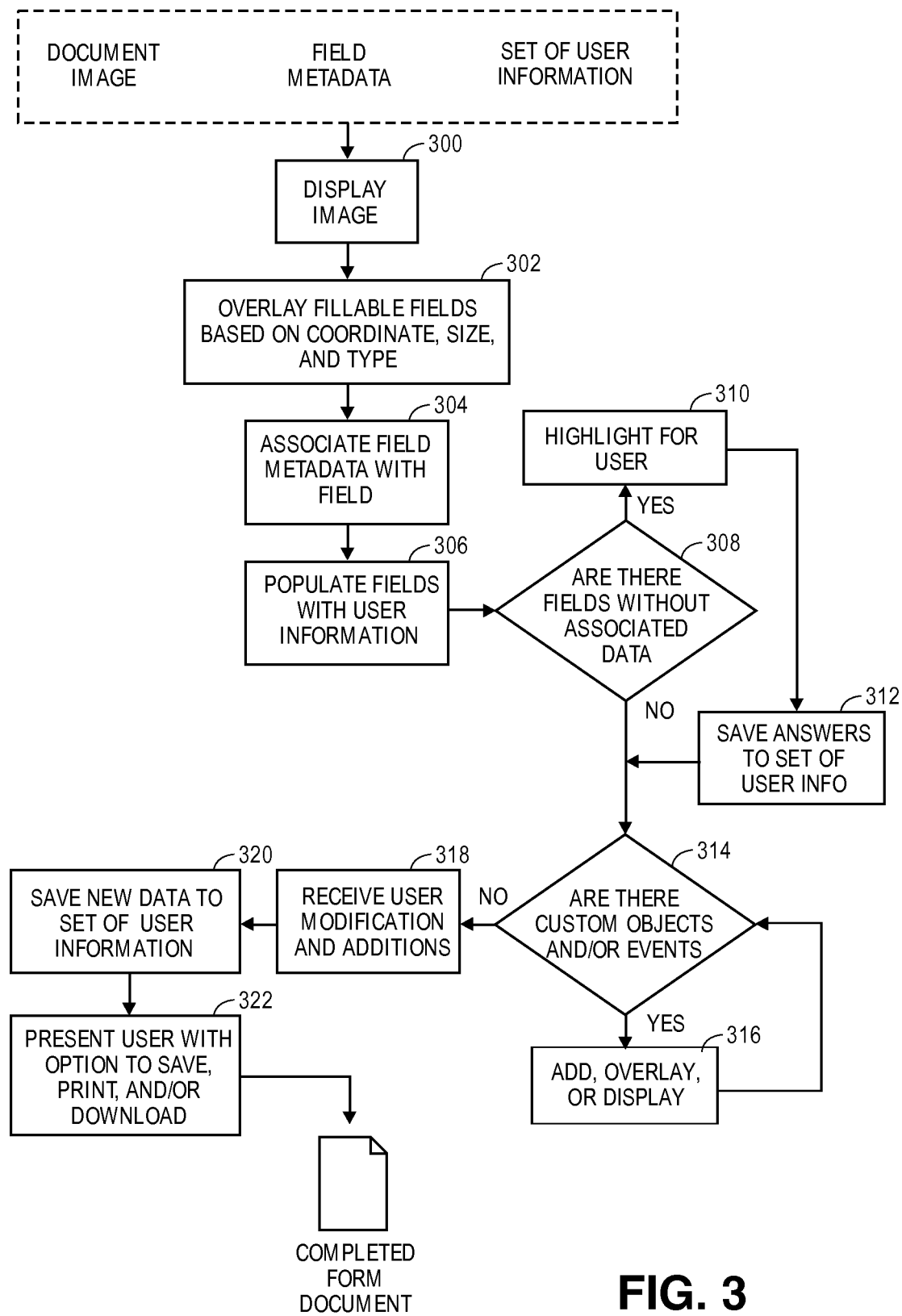
FIG. 3 is a flow diagram illustrating an exemplary operation of the form completion engine.

Turning to FIG. 3, the form completion engine receives, retrieves, accesses, or otherwise acquires the processed form document and the set of user information. The form completion engine then utilizes the above, in addition to user input in some instances, to produce the completed form document.

In Step 300, the form completion engine displays the captured image. The display of the captured image may be rendered on a monitor, as discussed below. The captured image may be retrieved from the image capture data store, or received from the form processing engine.

The captured image may be rendered in its entirety, or only those portions of the captured image that contain fields. For example, the captured image may contain pages of instructions or pages that are not pertinent to the user. As discussed above, fields of the form document that were completed in the original captured image may be displayed without those fields completed in the captured image, but will instead be displayed as a completed field overlaid on the image, as discussed below, to allow the user to make modifications and additions to those completed fields.

In Step 302, the form completion engine overlays the fields onto the displayed image. The form completion engine accesses and analyzes the field metadata to determine the fields to be created. The field metadata may be retrieved from the metadata data store, or received from the form processing engine.

Each field is rendered based upon the size and orientation information as stored in the field metadata. Each field is positioned and overlaid onto the captured image based upon field location information as stored in the field metadata, based upon the coordinate system discussed above or another reference system. It should be noted that the fields may be positioned prior to being rendered, or be positioned and rendered simultaneously. It should also be noted that though the fields are rendered, in some embodiments the fields are not visible to the user. In these embodiments, the fields are an invisible, fillable, overlay on the captured image. In other embodiments, the fields are visible, for example, as a transparent box with a thin outline. The rendered fields may not be precisely aligned with the image of the field that appear on the captured image.

In some instances, there is no shape on the form document to indicate the location of the field. In these instances, the form completion engine may calculate and apply the field in an area based upon the surrounding text. For example, the form completion engine may place the field for the taxpayer name six pixels to the right of the text on the form that reads "Name."

In embodiments of the invention, the fields are in hypertext markup language (HTML). The fields of these embodiments are known collectively as an HTML form (also known as a web form). The HTML form is rendered on a webpage that has the captured image displayed as a background image. The HTML form presents information to and receives input from the user. Possible field elements of the HTML form include, but are not limited to, a simple text box, a text area box, a radio button list, a check box list, a drop-down list, and a combination box for selecting multiple items from a list. The HTML form may also include other elements, including, but not limited to, a file selection controller for uploading a file, a reset or clear button, a save button, a print button, zoom control buttons, page control buttons, and a submit button.

The fields may have attributes designating the type and/or length of allowable input, such that the form completion engine may verify input from the user and populate the field with the correct type of data. For example, an attribute of a field may specify an e-mail address, which will be verified to be in the correct format, including an at-sign followed by a web address. As another example, an attribute of a field may specify a phone number, which will be verified to ensure that the input has an appropriate number of digits, each of which is a numeral.

The fields may also have associated field masks. Field masks ensure consistency and proper format of input information. For example, a field mask may automatically add a dash between the third and fourth, and between the fifth and sixth, digits of a social security number. As another example, a field mask may automatically format a date to meet the requirements of the form, regardless of the format as entered by the user. The form completion engine may also carry forward the formatted information for entry into other fields, and/or the saving of answers to the set of user information in Step 312 (discussed below).

In Step 304, the form completion engine associates field metadata with each of the overlaid fields. Association of the field metadata with each of fields serves at least two purposes: it aids in the population of the field by giving a requirement for the type of information to be input, and it aids in the saving of newly input information by the user into the set of user information. As before, the associated field metadata may be in the same file as the form document or in a separate but associated file.

In Step 306, the form completion engine populates the fields with known user information from the set of user information as stored in the user information data store. The form completion engine accesses, receives, or otherwise acquires at least a portion of the set of user information. The field completion engine compares the metadata associated with each item of information in the set of user information and determines similarities. For example, to fill a field with associated field name of "Taxpayer Address," the form completion engine would search or otherwise analyze the set of taxpayer information for a corresponding or related item of information. If a corresponding or related item of information is located, the form completion engine will enter that item of information into the field.

The form completion engine will continue to analyze and populate each field until complete. In some embodiments, the form completion engine will not populate certain fields based upon the set of user information. For example, if the field name is "Today's Date" the form completion engine will enter the current date and not access the set of user information. An another example, if the form document is a response to a notice document indicating that the taxpayer is delinquent on a tax, there may be a field named "Taxpayer's Personal Statement." The form completion engine may not access the set of taxpayer information to retrieve a past personal statement of the taxpayer, because a previously entered personal statement would likely not be accurate in response to the current notice document. As discussed below in Step 320, in some embodiments, such a personal statement would not likely be entered into the set of user information because it is of a type that is not relevant in repetition.

In Step 308, the form completion engine determines whether there are fields that have been not been completed in Step 306, other than those specifically left blank as discussed above. If there are, the form completion engine may analyze to determine whether proper information can be calculated or determined based upon the set of user information and/or the other completed fields. In some instances, this is a numerical calculation, a logical determination, or a combination thereof. A logical determination is a calculation or logical step based upon the prior input or associated data. The logical determination may prescribe or eliminate additional fields or other actions to be completed by the user. For example, if the field name is "Number of claimed dependents," there is no such item of information within the set of taxpayer information, but there are the names of three dependents in the set of taxpayer information as extracted from the most recent years tax return, the form completion engine may determine to enter "3" into the field. As another example, if the field name is "The sum of Box 4 and Box 5," the form completion engine may determine to add the figures appearing in fields named Box 4 and Box 5, and enter the summation into the field. As yet another example, if the field name is "Tax preparer name" and the tax preparer name is not stored in the set of taxpayer information, the form completion engine may enter contact information for a tax preparer associated with the form completion engine. As yet a still further example, if the user has an associated adjusted gross income below a certain threshold, the form completion engine may direct the user to not complete certain fields, such as by greying out the fields or directing the user to a subsequent field.

If there are fields without associated data following Step 306 and 308, these fields may be highlighted or otherwise designated for completion by the user in Step 310. These fields may be cycled or toggled through for the user to complete. It should be appreciated though, that some fields on the form document might be optional or not applicable to the user. For example, the form document may include a field for "Spouse Name" which would not be applicable to an unmarried user. These fields may have associated field metadata indicative that they are mandatory, recommended, optional, or not applicable.

In Step 312, as the user completes the additional fields, the information entered into the additional fields may be associated with metadata and saved to the set of user information in the user information data store. This allows future form documents for this user to be more quickly and efficiently completed. It should also be appreciated that in some embodiments, Steps 310 and 312 are performed after Step 318, discussed below. In these embodiments, the form completion engine displays the processed form document to the user and highlights (or otherwise indicates) the forms to be completed thereon.

In Step 314, the form completion engine determines whether there are custom objects and/or events to be added or completed. The custom objects and events may be based upon the form management application, specific user settings, or user input. If there are custom objects or events to be added, the form completion engine then adds the custom objects and/or events in Step 316. It should be noted portions of Step 314 and 316 may be completed before, during, and after Step 312. The custom objects and events are used to assist the user in inputting information, analyzing and utilizing the information input, etc.

The custom objects are digital items that are displayed on the form document by the form completion engine. The custom object may have been added or associated with the form document by the form processing engine, it may be added or associated via the form completion engine, or it may be added or associated in response to an action by the user. In some embodiments of the invention, the custom object is a representation of an external resource. The custom objects may include, but are not limited to, applets to perform functions, plugins to display various media, etc. Objects, and the functions they perform, may be triggered custom events, as discussed below.

The custom events respond and react to the user input. The custom events, either alone or in combination, trigger objects and other functions to be completed by the form completion engine. There are a number of possible custom events including, but are not limited to, mouse-based events (such as on the clicking of an element, on the pointer moving over an element, on the dragging of an element, etc.), keyboard-based events (such as on the pressing of a certain key, etc.), object-based events (such as on the navigation to a certain webpage, on resizing of the window, etc.), form-based events (such as on the clicking on a particular field, on the resetting of the form, on the selection of text, on the submission of the completed form, etc.), printer-based events, media-based events, server-based events (such as on an error by the server to save the completed form document), etc.

A few exemplary custom objects and/or events will now be discussed. In some embodiments, the form completion engine provides custom pagination. Pagination is the dividing the content of the form document into discrete electronic pages. For example, the form completion engine may display the top half of the processed form document on a first page, and the second half of the processed form document on a second page. As another example, the form completion engine may display a form document consisting of three pages in one single, continuous page.

In some embodiments, the form completion engine provides page zooming, including dynamic resizing of the text within the fields. In some embodiments, the form completion engine controls for font style, font size, etc. In some embodiments, the form completion engine provides field formats and masks to assist the user in easily completing the forms in a uniform and legible manner.

In some embodiments, the form completion engine provides contextual help for the user. Contextual help is a set of information helpful for a user in completing a particular field. For example, if the field is labeled "Adjusted Gross Income," a term that is unfamiliar to many lay taxpayers, the form completion engine may display a button or link near that field for contextual help. If the user selects that button or link (based upon a custom event as discussed above), the form completion engine may bring up a bubble of information directly over the captured image and/or fields. The contextual help may assist the user in understanding what the appropriate input is for that field, how to calculate or locate that information, where to get additional information, etc. Contextual help may also be presented for fields that were completed by the field completion engine to assist the user in verifying the input information.

Contextual help is located and supplied based upon the field name, the field type, and (if applicable) the form designation. The form completion engine may access a relevant data store to retrieve the contextual help. This retrieval may be upon the loading of the page, or upon the triggering of an event (such as on a pointer over the contextual help button or link).

In Step 318, the form completion engine displays the processed form document to the user and invites the user to provide additions and modifications to the information entered into the fields. The form completion engine is the application, either locally or remotely based, that displays the form document (including the fields overlaid on the captured image) to the user along with the above-discussed custom objects and events. It should be appreciated that the preceding steps of the method may be performed rapidly, such that displaying the processed form document to the user may be performed while the above steps are being completed. In other embodiments, the initial display of the processed form document to the user in Step 318 already includes the completed fields, as discussed above.

The user verifies the information in the fields that were populated in Step 306. The user may then add to or edit the information in these fields. The form completion engine may also specifically present or highlight the fields that were not completed, as discussed in Step 310. The form completion engine may also error check the user's edits and additions, and verify that the user has completed all of the fields on the form document. The form completion engine may highlight or otherwise bring to the user's attention any discovered errors or uncompleted fields.

In Step 320, any new information that is added or edited by the user is then saved or changed in the set of user information. As discussed above, in some instances the information entered into the fields will be of no relevance to future form documents. In some embodiments such information will not be added to the set of user information. New items of information will be added to the set of user information along with associated metadata. Edited items of information are edited in the set of user information. In some instances, the form management application (or another application) may inquire of the user whether such edits are of a recent change and whether such edits may represent an error in a previously completed form document. For example, if the user changes the house number in the taxpayer address, and such information was pulled from the previous year's tax return, there is a potential error in that tax return that may need to be corrected.

In Step 322, the user is presented with options to save, print, submit and/or download the completed form document. The user may also be presented with other options, such as to move on to the next form document to be completed, to consult with a tax or financial professional (either remotely or in person), to submit the form document for external verification by the tax or financial professional, to discard the form document, etc. In some embodiments, if the form document had a form designation as identified in Step 208, but there was no field metadata available for that form in Step 214, the form completion engine may save the form document (less the completed fields) to the data store such that it can be searched and utilized in future iterations.

Figure 4:
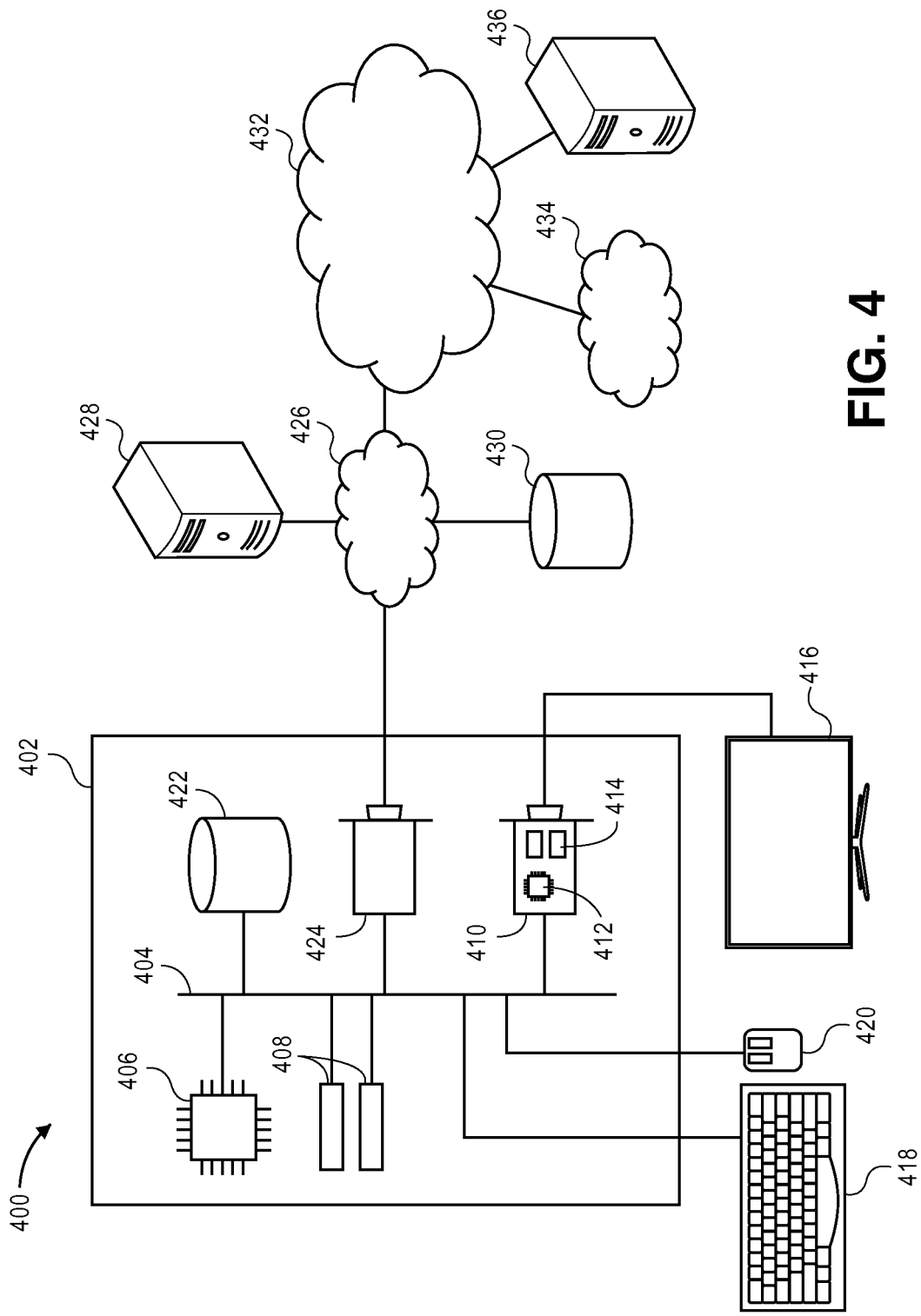
FIG. 4 is a system diagram of an embodiment of the invention depicting various computing devices and their components.

Turning to FIG. 4, a system of embodiments of the invention will now be discussed. The system may comprise computing devices to facilitate the functions and features described herein. The computing devices may comprise any number and combination of processors, controllers, integrated circuits, programmable logic devices, or other data and signal processing devices for carrying out the functions described herein, and may additionally comprise one or more memory storage devices, transmitters, receivers, and/or communication busses for communicating with the various devices of the system.

The system 400 comprising an exemplary hardware platform that can form one element of certain embodiments of the invention is depicted. Computer 402 can be a desktop computer, a laptop computer, a server computer, a mobile device such as a smartphone or tablet, or any other form factor of general- or special-purpose computing device. Depicted with computer 402 are several components, for illustrative purposes. In some embodiments, certain components may be arranged differently or absent. Additional components may also be present. Included in computer 402 is system bus 404, whereby other components of computer 402 can communicate with each other. In certain embodiments, there may be multiple busses or components may communicate with each other directly. Connected to system bus 404 is central processing unit (CPU) 406. Also attached to system bus 404 are one or more random-access memory (RAM) modules 408.

Also attached to system bus 404 is graphics card 410. In some embodiments, graphics card 404 may not be a physically separate card, but rather may be integrated into the motherboard or the CPU 406. In some embodiments, graphics card 410 has a separate graphics-processing unit (GPU) 412, which can be used for graphics processing or for general purpose computing (GPGPU). Also on graphics card 410 is GPU memory 414. Connected (directly or indirectly) to graphics card 410 is display 416 for user interaction. In some embodiments no display is present, while in others it is integrated into computer 402. Similarly, peripherals such as keyboard 418 and mouse 420 are connected to system bus 404. Like display 416, these peripherals may be integrated into computer 402 or absent. Also connected to system bus 404 is local storage 422, which may be any form of computer-readable media, and may be internally installed in computer 402 or externally and removably attached.

Finally, network interface card (NIC) 424 is also attached to system bus 404 and allows computer 402 to communicate over a network such as network 426. NIC 424 can be any form of network interface known in the art, such as Ethernet, ATM, fiber, Bluetooth, or Wi-Fi (i.e., the IEEE 802.11 family of standards). NIC 424 connects computer 402 to local network 426, which may also include one or more other computers, such as computer 428, and network storage, such as data store 430. Local network 426 is in turn connected to Internet 432, which connects many networks such as local network 426, remote network 434 or directly attached computers such as computer 536. In some embodiments, computer 402 can itself be directly connected to Internet 432.

The computer program of embodiments of the invention comprises a plurality of code segments executable by the computing device for performing the steps of various methods of the invention. The steps of the method may be performed in the order discussed, or they may be performed in a different order, unless otherwise expressly stated. Furthermore, some steps may be performed concurrently as opposed to sequentially. Also, some steps may be optional. The computer program may also execute additional steps not described herein. The computer program, system, and method of embodiments of the invention may be implemented in hardware, software, firmware, or combinations thereof using the system, which broadly comprises server devices, computing devices, and a communication network.

The computer program of embodiments of the invention may be responsive to user input. As defined herein user input may be received from a variety of computing devices including but not limited to the following: desktops, laptops, calculators, telephones, smartphones, or tablets. The computing devices may receive user input from a variety of sources including but not limited to the following: keyboards, keypads, mice, trackpads, trackballs, pen-input devices, printers, scanners, facsimile, touchscreens, network transmissions, verbal/vocal commands, gestures, button presses or the like.

The server devices and computing devices may include any device, component, or equipment with at least one processing element and at least one memory element. The processing element may implement operating systems, and may be capable of executing the computer program, which is also generally known as instructions, commands, software code, executables, applications ("apps"), and the like. The at least one processing element may comprise processors, microprocessors, microcontrollers, field programmable gate arrays, and the like, or combinations thereof. The at least one memory element may be capable of storing or retaining the computer program and may also store data, typically binary data, including text, databases, graphics, audio, video, combinations thereof, and the like. The at least one memory element may also be known as a "computer-readable storage medium" and may include random access memory (RAM), read only memory (ROM), flash drive memory, floppy disks, hard disk drives, optical storage media such as compact discs (CDs or CDROMs), digital video disc (DVD), and the like, or combinations thereof. In addition to the at least one memory element, the server devices may further include file stores comprising a plurality of hard disk drives, network attached storage, or a separate storage network.

The computing devices may specifically include mobile communication devices (including wireless devices), work stations, desktop computers, laptop computers, palmtop computers, tablet computers, portable digital assistants (PDA), smart phones, and the like, or combinations thereof. Various embodiments of the computing device may also include voice communication devices, such as cell phones and/or smart phones. In preferred embodiments, the computing device will have an electronic display operable to display visual graphics, images, text, etc. In certain embodiments, the computer program facilitates interaction and communication through a graphical user interface (GUI) that is displayed via the electronic display. The GUI enables the user to interact with the electronic display by touching or pointing at display areas to provide information to the system.

The communication network may be wired or wireless and may include servers, routers, switches, wireless receivers and transmitters, and the like, as well as electrically conductive cables or optical cables. The communication network may also include local, metro, or wide area networks, as well as the Internet, or other cloud networks. Furthermore, the communication network may include cellular or mobile phone networks, as well as landline phone networks, public switched telephone networks, fiber optic networks, or the like.

The computer program may run on computing devices or, alternatively, may run on one or more server devices. In certain embodiments of the invention, the computer program may be embodied in a stand-alone computer program (i.e., an "app") downloaded on a user's computing device or in a web-accessible program that is accessible by the user's computing device via the communication network. As used herein, the stand-along computer program or web-accessible program provides users with access to an electronic resource from which the users can interact with various embodiments of the invention.

In embodiments of the invention, users may be provided with different types of accounts. Each type of user account may provide their respective users with unique roles, capabilities, and permissions with respect to implementing embodiments of the invention. For instance, the user may be provided with a user account that permits the user to access embodiments of the invention that are applicable to uploading and completing form documents. Additionally, a tax preparer or financial professional may be provided with a tax preparer account or financial professional account, respectively, through which he can complete and manage the form documents on behalf of the user. In addition, any number and/or any specific types of account are provided to carry out the functions, features, and/or implementations of the invention. Upon the user, tax preparer, and/or financial professional logging in to the electronic resource for a first time, they may be required to provide various pieces of identification information to create their respective accounts. Such identification information may include, for instance, personal name, business name, email address, phone number, or the like. Upon providing the identification information, the user, tax preparer, and/or financial professional may be required to enter (or may be given) a username and password, which will be required to access the electronic resource.

Although embodiments of the invention have been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A system for processing and completing a form document on behalf of a user, the system comprising:
   one or more non-transitory computer readable storage media having a computer program stored thereon for performing steps of a form processing engine, said computer program configured to instruct one or more processing elements to perform steps including—
      capturing an image of a physical copy of the form document,
      wherein the form document is generated by a taxing authority,
      storing the captured image; and
      identifying, on the captured image, a form designator;
      accessing a form repository;
      identifying, from the form repository, a set of form metadata based upon the form designator;
      identifying and creating a set of fields located on the captured image of the form document based at least in part on the set of form metadata from the form repository,
      generating a set of field metadata corresponding to the determined set of fields,
      wherein the set of field metadata includes a field name for at least one field of the determined set of fields determined at least in part from text appearing on the captured image of the form document,
      storing the set of field metadata; and
   one or more non-transitory computer readable storage media having a computer program stored thereon for performing steps of a form completion engine, said computer program configured to instruct one or more processing elements to perform steps including—
      displaying the captured image;
      providing a set of overlaid fields onto the captured image, wherein each field of the set of overlaid fields is fillable with data;
      populating at least one field of the set of overlaid fields based upon a set of user information as stored in a user information data store and the field name of the generated set of field metadata;
      identifying a first field of the set of overlaid fields that was not populated and providing an indication to the user to complete the first field;
      adding, automatically, upon detection of completion of the first field by the user, a set of new user data to the set of user information; and
      presenting to the user a completed form document for review, including at least the captured image and the set of overlaid fields.

2. The system of claim 1, wherein the form completion engine is further configured to perform steps including receiving, from the user, modifications or additions to the data in the set of overlaid fields as displayed on the completed form document.

3. The system of claim 1,
   wherein the form processing engine receives the form document from the user,
   wherein the form document was not previously associated with the form processing engine.

4. The system of claim 1, wherein the form processing engine is configured to perform steps including retrieving already existing field metadata associated with the fields on the form document in addition to said step of generating a set of field metadata.

5. The system of claim 1,
   wherein the form processing engine is configured to perform steps including analyzing the form document to identify each field on the form document by a field name, a field type, and a field position,
   wherein the form completion engine is configured to perform steps including generating an HTML form having at least one field,
   wherein the form completion engine is configured to perform steps including overlaying the fields onto the displayed captured image based upon the field type and the field position.

6. The system of claim 1, wherein the form completion engine edits the set of user information based upon modifications by the user to fields that were populated by the form completion engine.

7. A computerized method for processing and completing a form document on behalf of a user, the method comprising the following steps:
   capturing an image of a physical copy of the form document,
   wherein the form document is generated by a taxing authority;
   storing the captured image;
   identifying, on the captured image, a form designator;
   accessing a form repository;
   identifying, from the form repository, a set of form metadata based upon the form designator;
   identifying and creating a set of fields located on the captured image of the form document based at least in part on the set of form metadata from the form repository;
   generating a set of field metadata corresponding to the determined set of fields,
   wherein the set of field metadata includes a field name for at least one field of the determined set of fields determined at least in part from text appearing on the captured image of the form document;
   storing the set of field metadata;
   displaying the captured image;
   providing a set of overlaid fields onto the captured image, wherein each field of the set of overlaid fields is fillable with data;
   populating at least one field of the set of overlaid fields based upon a set of user information as stored in a user information data store and the field name of the generated set of field metadata;
   identifying a first field of the set of overlaid fields that was not populated by the form completion engine and providing an indication to the user to complete the first field;
   adding, automatically, upon detection of completion of the first field by the user, a set of new user data to the set of user information; and
   presenting, to the user, a completed form document including at least the captured image and the set of overlaid fields.

8. The computerized method of claim 7, further comprising the step of receiving modifications or additions to the data in the set of overlaid fields as displayed on the completed form document.

9. The computerized method of claim 7, wherein the form document is newly received from the user.

10. The computerized method of claim 7, further comprising the step of retrieving already existing field metadata associated with the fields on the form document.

11. The computerized method of claim 7, further comprising the following steps:
- analyzing the form document to identify each field on the form document by a field name, and field type, and a field position;
- generating an HTML form having at least one field,
- wherein the step of providing the set of overlaid fields onto the displayed captured image is based upon the field type and the field position.

12. The computerized method of claim 7, further comprising the following step: editing the set of user information based upon modifications by the user to fields that were populated.

13. A non-transitory computer-readable storage medium with a computer program stored thereon for processing and completing a form document on behalf of a user, wherein the computer program instructs at least one processing element to perform the following steps:
- capturing an image of the form document;
- wherein the form document is generated by a taxing authority;
- storing the captured image in an image capture data store;
- identifying, on the captured image, a form designator;
- accessing a form repository;
- identifying, from the form repository, a set of form metadata based upon the form designator;
- identifying and creating a set of fields located on the captured image of the form document based at least in part on the set of form metadata from the form repository;
- generating a set of field metadata corresponding to the determined set of fields,
- wherein the set of field metadata includes a field name for at least one field of the determined set of fields determined at least in part from text appearing on the captured image of the form document;
- storing the set of field metadata;
- displaying the captured image;
- overlaying the set of fields onto the captured image, wherein each field of the set of fields is fillable with data;
- populating at least a portion of the set of fields based upon a set of user information as stored in a user information data store and the field name of the determined set of field metadata;
- identifying a first field that was not populated by the form completion engine and provide an indication to the user to complete the first field;
- receiving, from the user, modifications or additions to the data in the set of fields; and
- adding, automatically, upon detection of said additions to the first field by the user, a set of new user data to the set of user information.

14. The computer readable storage medium of claim 13, wherein the form document is newly received from the user.

15. The computer readable storage medium of claim 13,
- analyzing the form document to identify each field on the form document by a field name, and field type, and a field position;
- generating an HTML form having at least one field,
- wherein the step of providing the set of overlaid fields onto the displayed captured image is based upon the field type and the field position.

16. The computer readable storage medium of claim 13, further comprising the following step:
- editing the set of user information based upon modifications by the user to fields that were populated.

* * * * *